United States Patent Office 3,193,870
Patented July 13, 1965

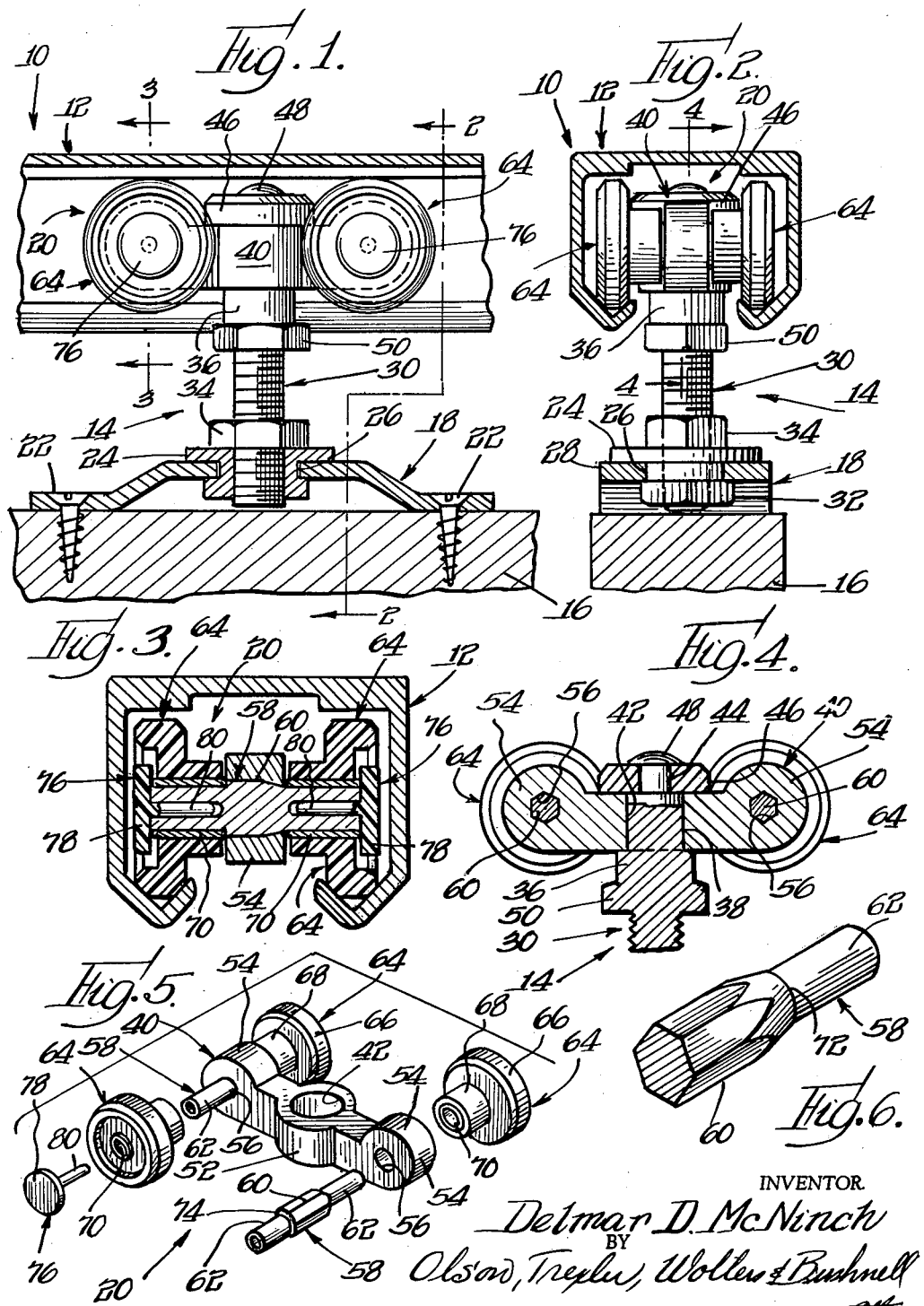

3,193,870
TRUCK ASSEMBLY FOR SLIDING DOORS
Delmar D. McNinch, Rock Falls, Ill., assignor to Lawrence Brothers, Inc., Sterling, Ill., a corporation of Illinois
Filed Apr. 25, 1963, Ser. No. 275,681
4 Claims. (Cl. 16—97)

This invention relates generally to hardware for use in sliding door installations and especially to truck assemblies from which a sliding door may be suspended.

Silding doors, particularly those for interior use, are common suspended from a trolley or truck assembly that operates in a box track. The track is oridinarily attached to the top jamb of a door frame; and in the past, the truck wheels have been loosely assembled to their respective axles, reliance being had on the sidewalls of the box track to keep the wheels in place. Such an assembly of the wheels has created problems and inconveniences before final installation; and therefore, other truck assemblies have been devised for permanent but rotatable connection of the wheels to the axles, riveting over of the ends of the axles being the common practice. This latter procedure overcomes the handling problem and is relatively inexpensive, but the riveted ends of the axles tend to gouge the sidewalls of the box track or drag thereagainst impeding movement of the truck assembly.

Accordingly, an important object of the present invention is to provide a truck assembly in which the ends of the axles are arranged for anti-friction engagement with the sidewalls of the cooperating box track.

A more general object of the invention is to provide a new and improved truck assembly for use in a sliding door installation.

Another object of the invention is to provide a truck unit of the type described which is easily and quickly assembled.

Still another object of the invention is to provide a truck unit which is made up from a minimum number of component parts.

A further object of the invention is to provide a truck assembly which is economical to produce.

These and other objects and features of the invention will become more apparent upon a reading of the following descriptions.

A truck assembly in accord with the invention includes a yoke body having a transverse bore and an axle member having a central portion secured in the bore and having exposed end portions, each of which receives a wheel member in rotatable fashion. The truck assembly of the invention also includes a hub cap member mounted to each of the end portions of the axle member, each of the hub cap members having a disc portion for holding the corresponding wheel member in position on the axle. In order to present an anti-friction surface to the sidewalls of the receiving track and to the hub of the cooperating wheel member, the disc portion of each of the hub cap members is fashioned from anti-friction material.

In order that the principles of the invention may be readily understood, a single embodiment thereof, but to which the application is not to be restricted, is shown in the accompanying drawing wherein:

FIG. 1 is a side elevational view of the top portion of a sliding door installation of the type including an overhead track, the track being cut away to reveal details of a truck assembly which is constructed in compliance with the invention, the door and its mounting plate being shown in cross-section to indicate their relationship;

FIG. 2 is a view taken substantially along the line 2—2 of FIG. 1;

FIG. 3 is an enlarged view taken substantially along the line 3—3 of FIG. 1;

FIG. 4 is a view taken substantially along the line 4—4 of FIG. 2;

FIG. 5 is an enlarged, exploded perspective view of the truck assembly of FIG. 1; and FIG. 6 is a further enlarged, fragmentary perspective view of the axle used in the truck assembly of the invention.

Referring now in detail to the drawing, specifically to FIGS. 1 and 2, a sliding door installation indicated generally by the numeral 10 is seen to include an overhead box track unit 12, a hanger assembly 14, a door 16, and a top door bracket 18. The track unit 12 is adapted to be mounted to the top jamb of a door frame, not shown. In addition, the hanger assembly 14 includes a trolley or truck assembly 20 that is adapted for rollable movement in the box track unit 12. The hanger assembly 14 suspendedly supports the door 16, the bracket 18 being fastened to the top edge of the door by wood screws 22 and the hanger assembly 14 including a nut member 24 which is coupleable to the bracket 18 for this purpose. More specifically, the nut 24 includes an endless peripheral groove 26; and the central upwardly deflected section of the bracket 12 is fashioned with a laterally opening slot 28, the nut 24 receiving the edges of the slot 28 at the groove 26 for use in coupling the bracket 18 and its suspended door to the hanger assembly 14. The hanger assembly 14 also includes a drop bolt 30, the lower end of which is threaded for progressive engagement by the nut 24. The bottom portion of the nut 24 may be fashioned with a hexagonal section 32 if desired. When the hexagonal section 32 is provided on the nut 24, that section may be used in gripping the nut for adjusting the progressive engagement of the nut with the threaded portion of drop bolt 30. A locknut 34 may be employed in conjunction with the nut 24.

With reference to FIG. 4, the drop bolt 30 is fashioned with a cylindrical portion 36 intermediate its ends. A reduced diameter portion 38 overlies the cylindrical portion 36 to define a shoulder on which a main yoke or housing 40 of the truck assembly 20 is positioned. The yoke 40 is perforated with a bore 42 which slidably and rotatably receives the reduced diameter portion 38 of the drop bolt 30. The drop bolt 30 is fashioned with a further reduced diameter portion 44 overlying the portion 38; and in order to mount the yoke 40 to the drop bolt 30, a washer 46 is passed over the portion 44 to rest on the shoulder defined between the portions 38 and 44. Thereafter, the portion 44 is riveted over to define a head 48 that serves to hold the washer 46 in place. If desired, a supplemental washer of bearing material may be disposed beneath the washer 46 in contact with the upper surface of the yoke 40. In addition, the drop bolt 30 may be provided with an auxiliary head 50 between the cylindrical portion 36 and the lower threaded end portion, auxiliary head 50 being fashioned with a hexagonal section for ease in gripping the drop bolt.

Referring to FIG. 5, the main yoke or housing 40 of the truck assembly is seen to include a central hub 52 which is perforated with the aperture 42. In addition, the yoke 40 includes a pair of arms 54 which extend from the hub 52 in diametric directions. The yoke 40 is advantageously fabricated in a die casting operation using a suitable alloy. Alternatively, the yoke 40 may be fabricated as a steel stamping or as an extrusion, and various metals may be employed. Each of the arms 54 is perforated with a transverse bore 56 in order to receive an axle member 58; and while various fabrications of the yoke 40 have been described immediately hereinabove, the yoke 40 is to be so constructed that the sidewalls of the bores 56 are of yieldably deformable material.

In compliance with a feature of the invention, each of the axle members 58 includes a central portion 60 of non-round cross-section. Each of the axle members 58 further includes cylindrical end portions 62 which are adapted to be exposed laterally of the arms 54 of the yoke 40 for rotatably receiving wheel units 64. The end portions 62 of the axle members are fabricated as tubular elements for purposes to be described more fully hereinafter; and each of the wheel units 64 advantageously comprises an integral wheel 66 and hub 68 that are fabricated from a resinous anti-friction material such as nylon molding resin. An oil-impregnated sleeve bearing 70 is situated in the central bore of each wheel unit 64 for rotatably receiving the tubular end portions 62 of the corresponding axle member.

In further accord with the invention, the axle members 58 are fixedly secured in the bores 56 of the yoke 40; and for this purpose, the central portions 60 of the axle members are fashioned with non-round section, specifically hexagonal section in the embodiment shown. Moreover, the central portion of each axle member is somewhat larger in diameter than the corresponding bore in the yoke; and at least the central portion of the axle member is made from a harder material than the yoke 40. Thus, the axle member may be assembled to the yoke at a bore 56 in an interference fit, the central portion of the axle member deforming the sidewalls of the bore, cutting away and expanding the metal thereof to establish an intimately fitted relationship. This is best seen in FIG. 4.

Referring for the moment to FIG. 6, the axle member 58 is seen to be fashioned with a tapered portion 72 between the central portion 60 and one of the tubular end portions 62. This tapered portion 72 acts to lead the non-round and oversized central portion 60 into the bore 56 in an easy manner. Returning to FIG. 5, the opposite end of the central portion 60 is seen to terminate in a flat shoulder 74 that is used to locate the axle member with respect to the arm of the yoke in which it is assembled, the shoulder 74 being finally disposed coplanarly with a side face of the arm.

In compliance with another feature of the invention, each of the wheel units 64 is held in place on an axle member 58 by means of a hub cap member 76; and as will be seen in FIG. 5, a hub cap member 76 comprises a disc portion 78 and a stem portion 80 which extends laterally from the disc portion 78 at the center thereof. The hub cap member 76 is fashioned from an anti-friction material, particularly a resinous anti-friction material such as nylon molding resin in order that the disc portion 78 thereof may present an anti-friction surface to the sidewall of the track unit 12 and to the confronting surface of the cooperating wheel unit 64. Advantageously, the stem portion 80 and the disc portion 78 are molded integrally; and the hub cap member 76 is adapted to be assembled to an axle member 58 by insertion of its stem portion 80 into the tubular end portion 62 of the axle member, the stem portion 80 being sized to establish an interference fit.

Having thus described one construction of the truck assembly 20 and its relationship in the door installation 10, it is advantageous now to set forth the simple and expedient manner in which the truck assembly 20 is put together. First, the axle members 58 are inserted in the bores 56 of the yoke 40, the tapered portions 72 leading the non-round central portions 60 into the corresponding bores 56. Next, the wheel units 64 are slipped onto the exposed tubular end portions of the axle members 58; and then the hub cap members 76 are assembled to the end portions of the axle members, the stem portions 80 entering the bores in the tubular end portions 62 of the axle members. This assembly procedure is simple and convenient and incorporates a minimum number of individual operations. Substantial production economies result. Moreover, as will be seen from an inspection of FIG. 3, the hub cap members 76 present the anti-friction disc portions 78 to the vertical sidewalls of the track unit 12 whereby to prevent either dragging or gouging of the sidewalls by the axles of the truck assembly.

The specific example herein shown and described is to be considered as being primarily illustrative. Various changes may occur to those skilled in the art; and such changes are to be understood as forming a part of this invention insofar as they fall within the spirit and scope of the appended claims.

The invention is claimed as follows:

1. A truck assembly for use in a sliding door installation of the type including an overhead track, said truck assembly comprising: a yoke body having means for attaching a sliding door thereto and having a transverse bore, the walls of said bore being of yieldably deformable material; an axle member having exposed tubular end portions and a central portion situated in said bore in an interference fit; a wheel member rotatably mounted on each of said end portions; and a hub cap member mounted to each of said end portions, including a stem portion received in said tubular end portion and a disc portion at the outer end of said stem portion for holding the corresponding wheel member in position on said axle member.

2. A truck assembly for use in a sliding door installation of the type including an overhead track, said truck assembly comprising: a yoke body having means for attaching a sliding door thereto and having a transverse bore, the walls of said bore being of yieldably deformable material; an axle member having exposed tubular end portions and a central portion situated in said bore in an interference fit; a wheel member rotatably mounted on each of said end portions; and a hub cap member mounted to each of said end portions, including a stem portion received in a said tubular end portion and a disc portion at the outer end of said stem portion for holding the corresponding wheel member in position on said axle member, said disc portion being of anti-friction material and being disposed to extend outwardly beyond the corresponding wheel member whereby to present an anti-friction surface to the sidewalls of said track and to the hub of the cooperating wheel member.

3. A truck assembly for use in a sliding door installation of the type including an overhead track, said truck assembly comprising: a yoke body having means for attaching a sliding door thereto and having a transverse bore; an axle member having exposed end portions and a central body situated in said bore; and a wheel member rotatably mounted on each of said end portions, one of said yoke body and said central body being of relatively soft, deformable material and the other of said bodies being of relatively hard material, the body of relatively deformable material being generally conformed to the shape of the body of relatively hard material at their region of mutual engagement whereby to mount said axle member positively to yoke member.

4. A truck assembly according to claim 3 wherein said transverse bore is originally of cylindrical shape and wherein said central body is originally of non-round section.

References Cited by the Examiner
UNITED STATES PATENTS

| | | | |
|---|---|---|---|
| 639,987 | 12/99 | Tines | 16—98 |
| 1,192,966 | 8/16 | Willard | 16—105 |
| 1,931,796 | 10/33 | Hoffman | 16—98 |
| 2,677,154 | 5/54 | Agle | 16—98 |
| 2,917,771 | 12/59 | Lahrie | 16—105 |
| 2,952,483 | 9/60 | Fleckstein et al. | 287—52 |
| 3,032,919 | 5/62 | Amsler | 46—17 X |

DONLEY J. STOCKING, *Primary Examiner.*